United States Patent
Hu et al.

(10) Patent No.: US 9,578,042 B2
(45) Date of Patent: *Feb. 21, 2017

(54) IDENTIFYING MALICIOUS WEB INFRASTRUCTURES

(71) Applicant: International Business Machines Corporation, Armonk, NY (US)

(72) Inventors: Xin Hu, White Plains, NY (US); Jiyong Jang, White Plains, NY (US); Ting Wang, White Plains, NY (US); Jialong Zhang, College Station, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,997

(22) Filed: Jun. 18, 2015

(65) Prior Publication Data

US 2016/0261608 A1    Sep. 8, 2016

Related U.S. Application Data

(63) Continuation of application No. 14/640,658, filed on Mar. 6, 2015.

(51) Int. Cl.
*G06F 21/55* (2013.01)
*H04L 29/06* (2006.01)
*G06F 15/16* (2006.01)

(52) U.S. Cl.
CPC ........... *H04L 63/126* (2013.01); *H04L 63/101* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| 9,195,826 B1 | 11/2015 | Fang et al. |
| 9,225,730 B1 | 12/2015 | Brezinski |
| 2005/0120242 A1 | 6/2005 | Mayer et al. |

(Continued)

OTHER PUBLICATIONS

Network Monitoring using Traffic Dispersion Graphs(TDGs). Iliofotou et al. ACM(2007).*

(Continued)

*Primary Examiner* — Venkat Perungavoor
(74) *Attorney, Agent, or Firm* — Yee & Associates, P.C.; Jeffrey S. LaBaw

(57) ABSTRACT

Identifying malicious servers is provided. Malicious edges between server vertices corresponding to visible servers and invisible servers involved in network traffic redirection chains are determined based on determined graph-based features within a bipartite graph corresponding to invisible server vertices involved in the network traffic redirection chains and determined distance-based features corresponding to the invisible server vertices involved in the network traffic redirection chains. Malicious server vertices are identified in the bipartite graph based on the determined malicious edges between the server vertices corresponding to the visible servers and invisible servers involved in the network traffic redirection chains. Access by client devices is blocked to malicious servers corresponding to the identified malicious server vertices in the bipartite graph.

8 Claims, 9 Drawing Sheets

(56) References Cited

U.S. PATENT DOCUMENTS

| | | |
|---|---|---|
| 2009/0049171 A1 | 2/2009 | Hughes et al. |
| 2010/0082513 A1 | 4/2010 | Liu |
| 2010/0125572 A1 | 5/2010 | Poblete et al. |
| 2010/0138925 A1 | 6/2010 | Barai et al. |
| 2012/0084860 A1 | 4/2012 | Cao et al. |
| 2013/0036470 A1 | 2/2013 | Zhu et al. |
| 2013/0179974 A1 | 7/2013 | Manadhata et al. |
| 2015/0188941 A1 | 7/2015 | Boshmaf et al. |

OTHER PUBLICATIONS

Detecting Malicious Clients in ISP Networks Using HTTP Connectivity Graph and Flow Information. Liu et al.IEEE(2014).*

Optimizing a Radial Layout of Bipartite Graphs for a Tool Visualizing Security Alerts. Dumas et al. LNCS(2011).*

Grill, "Detecting Malicious Network Behavior Using Only TCP Flag Information," IP.com Prior Art Database Technical Disclosure No. IPCOM000238173D, Aug. 6, 2014, 22 pages.

Stillman et al., "Threats Introduced by Reliable Server Pooling (RSerPool) and Requirements for Security in Response to Threats (RFC5355)," IP.com Prior Art Database Technical Disclosure No. IPCOM000174989D, Oct. 1, 2008, 21 pages.

Hu et al., "Identifying Malicious Web Infrastructures," U.S. Appl. No. 14/640,658, filed Mar. 6, 2015, 46 pages.

List of IBM Patents or Patent Applications Treated as Related, 2 pages.

Liu et al., "Detecting Malicious Clients in ISP Networks Using HTTP Connectivity Graph and Flow Information," 2014 IEEE/ACM International Conference on Advances in Social Networks Analysis and Mining (ASONAM 2014), Aug. 2014, pp. 150-157.

Tamassia et al., "Graph Drawing for Security Visualization," Graph Drawing, Sep. 2008, Lecture Notes in Computer Science vol. 5417, pp. 2-13.

Tran et al., "Abnormal Web Traffic Detection Using Connection Graph," Bulletin of Networking, Computing, Systems, and Software, vol. 3, No. 1, Jan. 2014, pp. 57-62.

Venzhega et al., "Graph-based Malware Distributor Detection," Proceedings of the 22nd International Conference on World Wide Web, 2013, pp. 1141-1144.

Office Action, dated Apr. 18, 2016, regarding U.S. Appl. No. 14/640,658, 21 pages.

Notice of Allowance, dated Sep. 30, 2016, regarding U.S. Appl. No. 14/640,658, 12 pages.

* cited by examiner

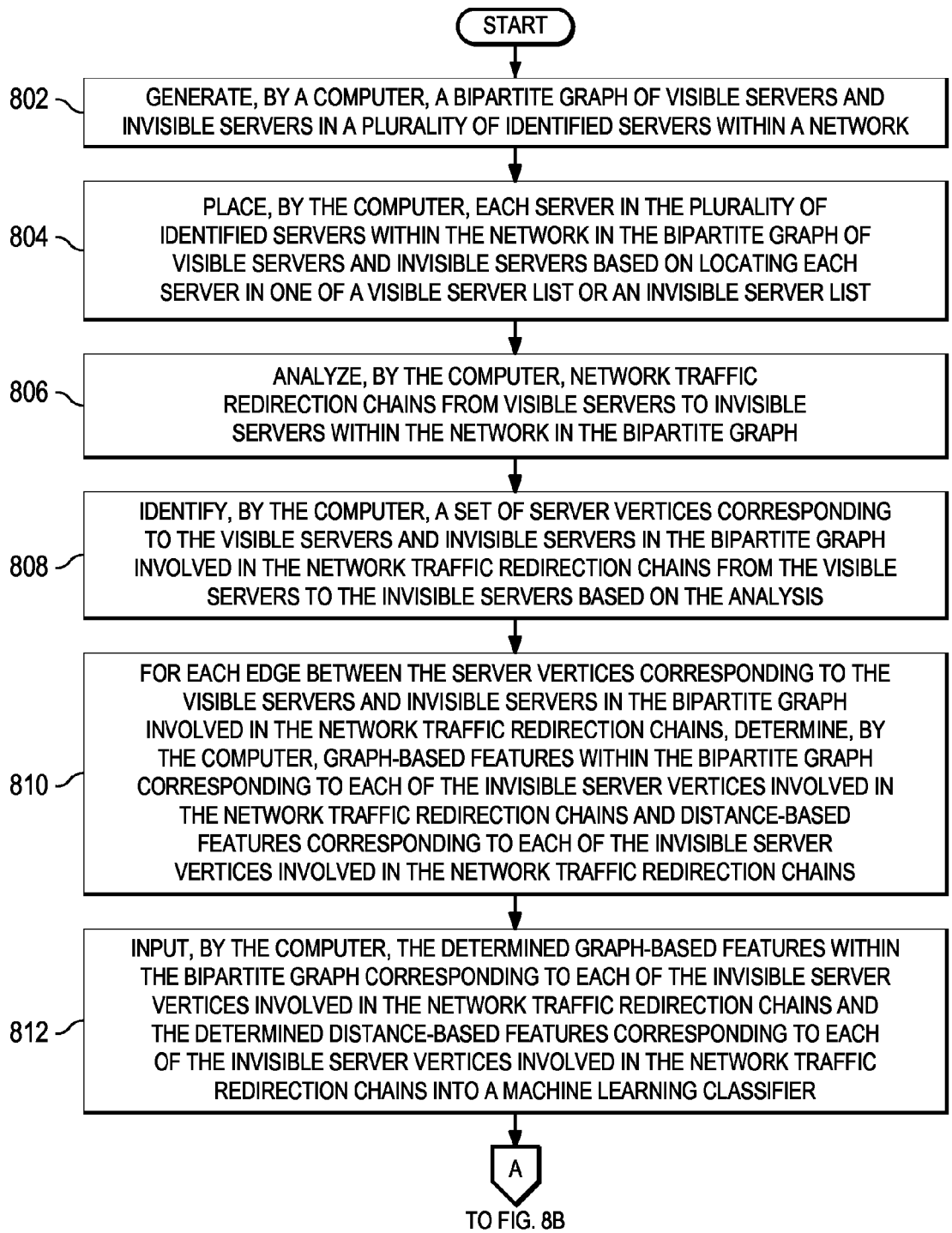

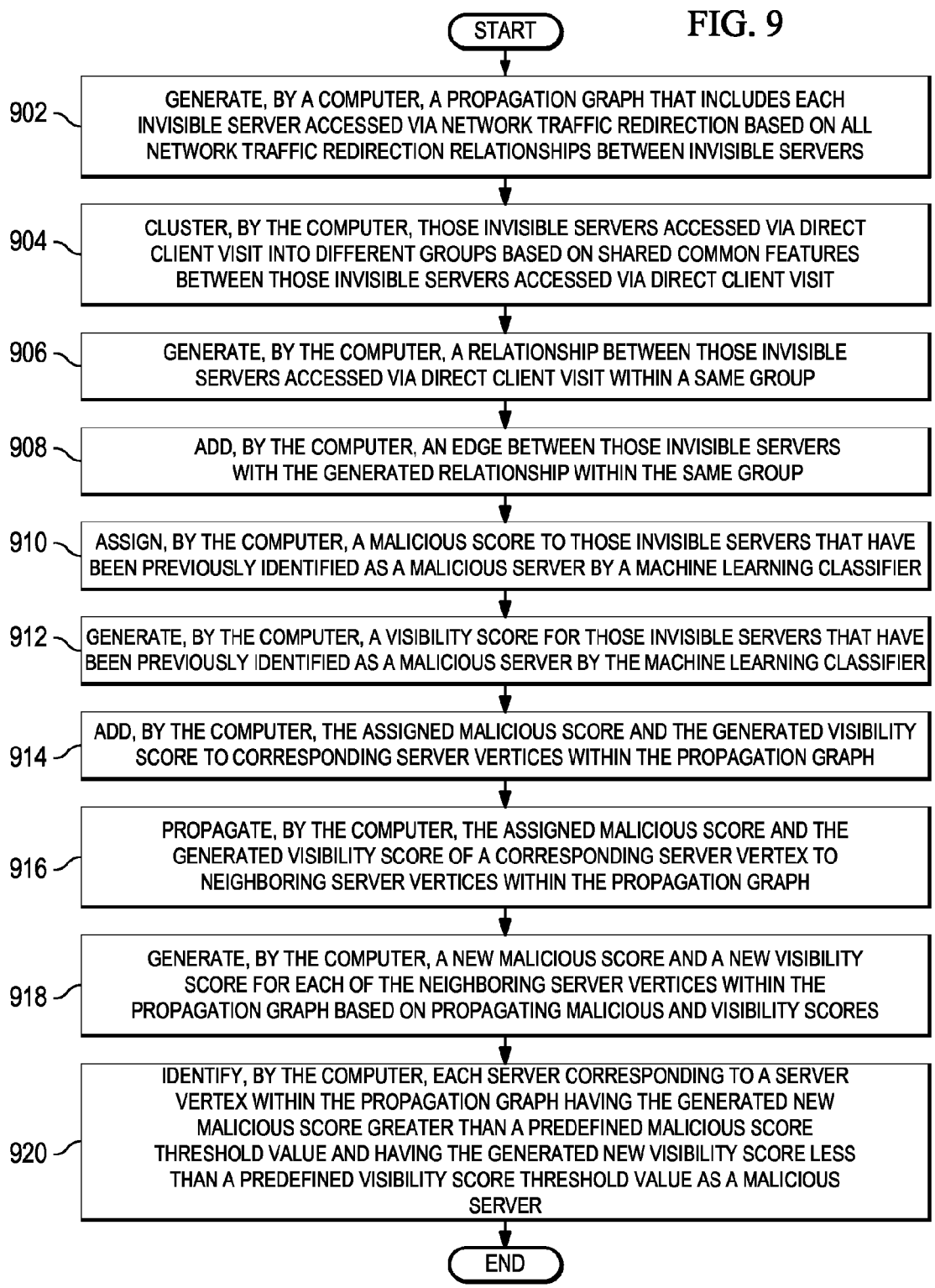

IDENTIFYING MALICIOUS WEB INFRASTRUCTURES

This application is a continuation of prior application Ser. No. 14/640,658, filed Mar. 6, 2015.

BACKGROUND

1. Field

The disclosure relates generally to computer network security and more specifically to identifying malicious servers within malicious Web infrastructures based on visibility of network servers and topology of network traffic redirection chains of network servers.

2. Description of the Related Art

Malicious Web activities are a major threat to the safety of online Web users and their computers. These malicious Web activities are orchestrated through malicious Web infrastructures, which enable cyber criminals to conduct their criminal activities on the Web and utilize other cyber criminals' resources within the malicious Web infrastructures. Such malicious Web infrastructures are the backbone of these criminal activities in today's cyberspace, delivering malicious content, such as malicious software, globally and causing hundreds of millions of dollars in damage every year. Malicious software, or malware for short, is any software used to disrupt computer operations, gather sensitive information stored on computers, or gain access to private computer systems and networks, for example. Malware is an umbrella term referring to a variety of hostile or intrusive software, such as, for example, computer viruses, worms, Trojan horses, ransomware, spyware, adware, scareware, and other malicious programs.

SUMMARY

According to one illustrative embodiment, a computer-implemented method for identifying malicious servers is provided. A computer determines malicious edges between server vertices corresponding to visible servers and invisible servers involved in network traffic redirection chains based on determined graph-based features within a bipartite graph corresponding to invisible server vertices involved in the network traffic redirection chains and determined distance-based features corresponding to the invisible server vertices involved in the network traffic redirection chains. The computer identifies malicious server vertices in the bipartite graph based on the determined malicious edges between the server vertices corresponding to the visible servers and invisible servers involved in the network traffic redirection chains. The computer blocks access by client devices to malicious servers corresponding to the identified malicious server vertices in the bipartite graph. According to other illustrative embodiments, a computer system and a computer program product for identifying malicious servers are provided.

BRIEF DESCRIPTION OF THE DRAWINGS

FIGS. 8A and 8B are a flowchart illustrating a process for identifying malicious servers within a network in accordance with an illustrative embodiment; and FIG. 9 is a flowchart illustrating a process for propagating malicious and visibility scores of identified malicious servers to neighboring invisible servers to identify additional malicious servers based on their correlation to the identified malicious servers in accordance with an illustrative embodiment.

DETAILED DESCRIPTION

Figure 1:
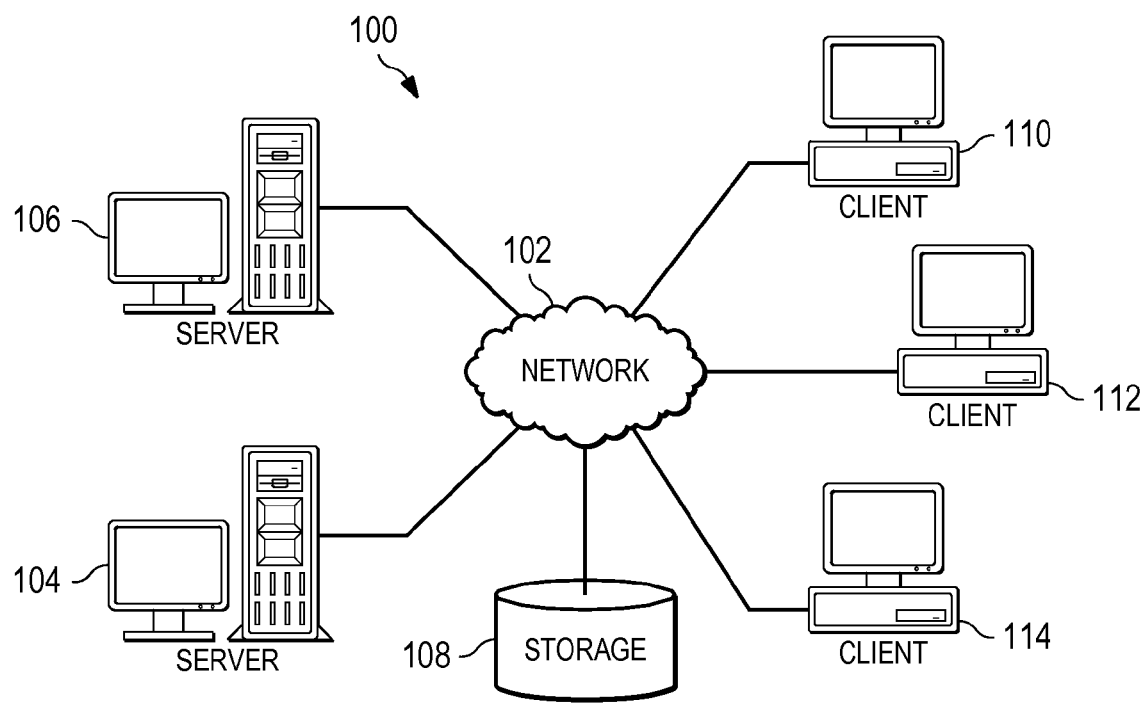
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
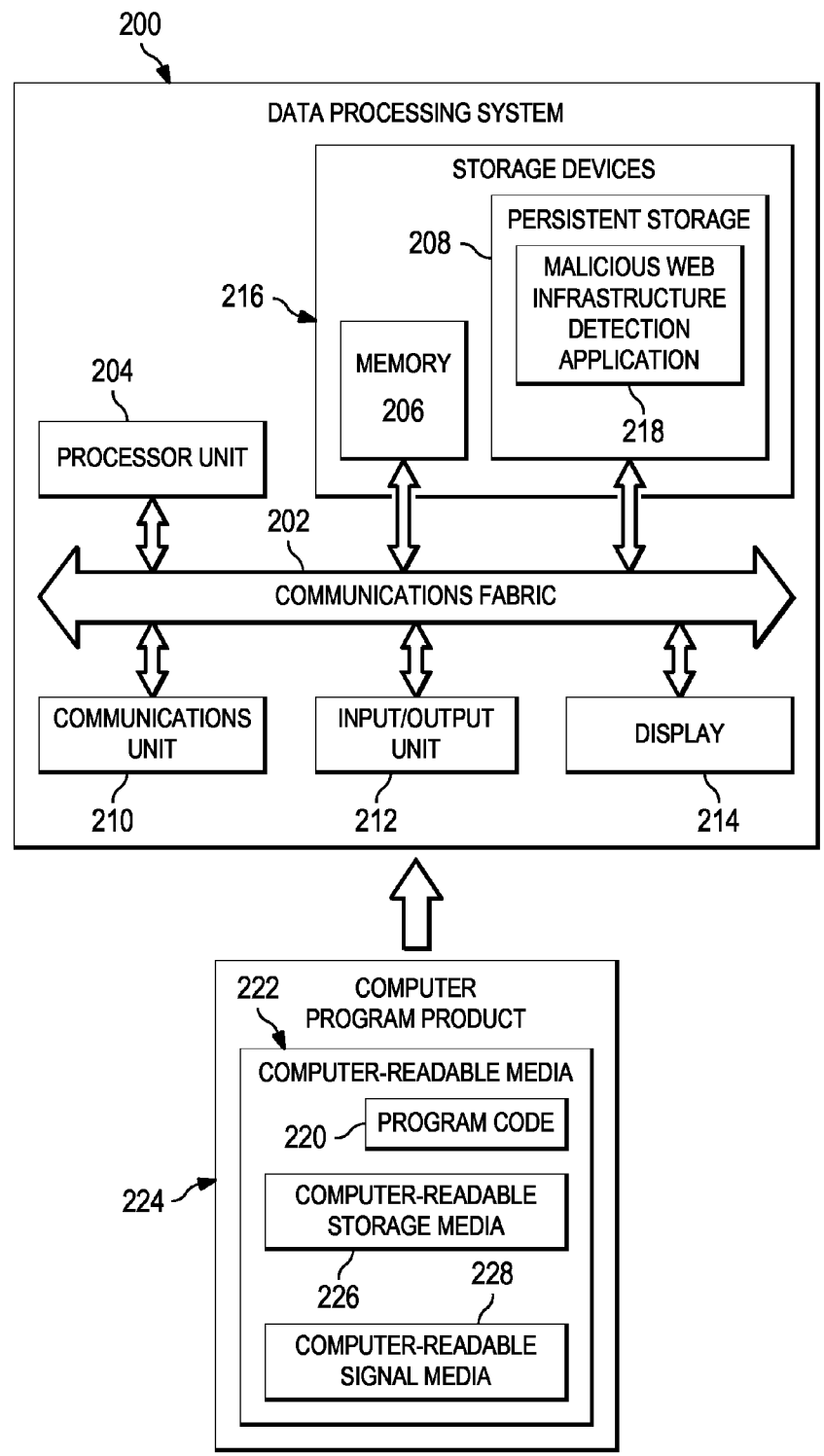
FIG. 2 is a diagram of a data processing system in which illustrative embodiments may be implemented.

With reference now to the figures, and in particular, with reference to FIGS. 1 and 2, diagrams of data processing environments are provided in which illustrative embodiments may be implemented. It should be appreciated that FIGS. 1 and 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 may provide a set of one or more services to client devices connected to network 102. For example, server 104 may provide a malicious Web infrastructure detection service to registered client devices. A malicious Web infrastructure detection service is a process that identifies malicious servers within malicious Web infrastructures based on visibility of the network servers and the topology of network traffic redirection chains created by the network servers. The malicious Web servers attempt to deliver malicious content, such as malware, to computers and other data processing system devices, such as smart phones, connected to the malicious Web infrastructure.

Client device 110, client device 112, and client device 114 also connect to network 102. Client devices 110, 112, and 114 are registered clients to server 104. In the depicted example, server 104 may provide information, such as boot files, operating system images, and software applications to client devices 110, 112, and 114.

In this example, client devices 110, 112, and 114 are computers, such as desktop computers or network computers with wire or wireless communication links to network 102. However, it should be noted that client devices 110, 112, and 114 are intended as examples only. In other words, client devices 110, 112, and 114 also may include laptop computers, tablet computers, handheld computers, smart phones, and personal digital assistants, for example.

Storage 108 is a network storage device capable of storing data in a structured format or unstructured format. Storage 108 may provide storage of a plurality of different client device user names and associated identification numbers; user profiles; and user account information associated with the malicious Web infrastructure detection service. Storage 108 also may store malicious Web infrastructure detection software applications, server domain name white lists, search engines, server domain name search results, visible server lists, invisible server lists, bipartite graphs of visible and invisible servers, machine learning classifiers, server network traffic propagation chain graphs, clustering programs, malicious server lists, compromised servers lists, and the like. Further, storage unit 108 may store other data, such as authentication or credential data that may include user names, passwords, and biometric data associated with the plurality of users and system administrators. It should be noted that storage unit 108 may store any data that may be utilized by the malicious Web infrastructure detection service.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores malicious Web infrastructure detection application 218. Malicious Web infrastructure detection application 218 is a software program that provides the service of identifying malicious servers in one or more malicious Web infrastructures located within a network of a plurality of servers based on visibility of each of the plurality of servers and the topology of network traffic redirection chains created by one or more of the plurality of servers. After identifying which servers within the network are malicious servers, malicious Web infrastructure detection application 218 may automatically take action, such as, for example, block access to those identified malicious servers and notify network security personnel or system administrators to determine whether further action is required, such as notifying appropriate authorities of cyber criminal activity.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200. In some instances, computer readable storage media 226 may not be removable from data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 220 may be downloaded over a network to persistent storage 208 from another device or data processing system through computer readable signal media 228 for use within data processing system 200. For instance, program code stored in a computer readable storage media in a data processing system may be downloaded over a network from the data processing system to data processing system 200. The data processing system providing program code 220 may be a server computer, a client computer, or some other device capable of storing and transmitting program code 220.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 226 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that cyber criminals utilize malicious web infrastructures to industrialize their criminal activities via server network traffic redirection and to share resources with other cyber criminals within their malicious web infrastructures. Malicious web infrastructures have become one of the major vehicles for cyber criminals to deliver their malicious Web content, such as, for example, phishing Web pages, exploit kits that deliver a malicious payload to a victim's computer to steal information and exploit computer vulnerabilities, and other types of malware on a global scale. To avoid detection, these cyber criminals often exploit compromised benign Web servers as stepping stones to redirect network traffic of visitors of those compromised benign Web servers, potentially through multiple hops, to malicious servers that host the malicious Web content. Moreover, these cyber criminals also exploit a variety of other methods to hide their malicious servers from detection by, for example, domain name generation and fast fluxing. Fast fluxing is a Domain Name System technique used to hide phishing and malware delivery sites behind an ever-changing network of compromised servers acting as proxies. The basic idea behind fast fluxing is to have numerous Internet Protocol (IP) addresses associated with a single registered domain name, where the IP addresses are swapped in and out with high frequency, through changing Domain Name System records. Therefore, it is critical to identify the persistent features and properties of these malicious web infrastructures to defend against such dynamic constructs.

Existing solutions study these malicious Web infrastructures by analyzing how the malicious campaigns operate at each attack channel, such as, for example, scamming hosting infrastructures and malicious advertising networks. For example, existing solutions study the topology of malicious Web infrastructures. These existing solutions are limited by requiring an initial set of identified malicious servers to seed the propagation onto a server topology graph to find more malicious servers.

In terms of detecting malicious Web servers, existing solutions fall into two categories: 1) static feature-based detection; and 2) dynamic feature-based detection. Static feature-based systems analyze the content of Web pages and extract features, such as Uniform Resource Locator (URL) patterns, presence of certain dangerous tags or functions, or the presence of malicious JavaScript codes, which can be used to distinguish malicious Web pages from benign Web pages. Dynamic feature-based systems, on the other hand, visit Websites with an instrumented browser and monitor all the run-time traces for signs of malicious Web activities. Although those existing solutions may detect malicious Web servers, cyber criminals are evolving and increasingly adopting a variety of mechanisms, such as, for example, obfuscation, cloaking, and the like, to evade detection. For example, existing solutions extract features from sever redirection behavior to detect malicious Web infrastructures, including network traffic redirection chain length, different referral fields, country similarity, et cetera. However, these extracted features may be easily manipulated by cyber criminals. For example, referral fields may be arbitrarily set by cyber criminals and the length of the network traffic redirection chain may be altered by adding more compromised benign servers in the middle of the chain. In addition, these existing solutions also rely on client features, such as, for example, diversity of browsers used by clients and diversity of countries where the clients are located. These existing solutions require information collected from a large number of clients and are less effective when applied to enterprise networks.

In contrast, illustrative embodiments may be deployed in both enterprise networks and Internet Service Provider (ISP) networks, and may detect malicious web infrastructures even when only a few clients access the malicious Web infrastructures. Illustrative embodiments exploit persistent features and properties of malicious Web infrastructures from a new perspective, which allows automatic detection of malicious Web infrastructures without requiring any seed malicious Web servers. Illustrative embodiments detect such inherent features and properties of malicious Web infrastructures by leveraging the visibility of servers within a network and the topology of server network traffic redirection chains. Additionally, illustrative embodiments utilize a server network traffic propagation chain algorithm to identify more malicious Web servers and compromised benign Web servers.

Illustrative embodiments detect malicious web infrastructures based on the server visibility to search engines and the topology of network traffic redirection chains between visible servers and invisible servers. While benign servers are usually visible and may be found by searching using search engines, most malicious servers are invisible to search engines, either because cyber criminals may purposefully block search engines to prevent being searchable or because search engines may intentionally remove malicious servers from their index to protect end users. More importantly, network traffic redirection behavior between visible servers and invisible servers are significantly different from network traffic redirection behavior between malicious servers. Illustrative embodiments identify several distinct features of the visible server to invisible server transitions within network traffic redirection chains to accurately detect malicious servers within malicious Web infrastructures and generate a server network traffic propagation chain graph to identify more compromised benign servers and malicious servers within the detected malicious Web infrastructures.

In addition, illustrative embodiments decrease the amount of network traffic that needs to be analyzed to detect the malicious servers because illustrative embodiments only analyze network traffic redirection between visible servers and invisible servers within the network, instead of analyzing the network traffic of the entire redirection chain. As a result, illustrative embodiments are more efficient and suitable for large enterprise networks rather than existing solutions. Further, illustrative embodiments may detect malicious Web infrastructures even when there are only a few clients accessing the malicious Web infrastructures, while existing solutions require a large and diverse number of clients that are accessing the malicious Web infrastructures. Furthermore, illustrative embodiments may proactively identify hidden malicious Web servers and compromised benign Web servers before these servers are detected by existing solutions that use blacklists of Web servers, for example.

An illustrative embodiment may include three main components: 1) a server visibility check component; 2) a malicious infrastructure detection component; and 3) a malicious infrastructure server propagation chain detection component. The server visibility check component automatically checks Web server white lists to determine whether a second level domain name of each Web server within a network is located within one or more white lists. The white lists may include, for example, Alexa Top 1 million servers list and EasyList server list because these white lists contain most known and popular Web server domain names. If a Web server is located within a white list, the server visibility check component identifies the Web server as a visible server. If a Web server is not found within any of the searched white lists, then the server visibility check component will query a set of search engines, such as, for example, Google, Bing, Yahoo!, and Baidu, for Web server domain names. The server visibility check component may select, for example, the top 50 domain names from the search results. If a Web server, which was not found within a white list, is found within the search result domain name list, the server visibility check component identifies the Web server as a visible server. If a Web server, which was not found within a white list, also is not found within the search result domain name list, the server visibility check component identifies the Web server as an invisible server.

The malicious infrastructure detection component determines all pairs of Web servers that are involved in network traffic redirection from visible servers to invisible servers and builds a bipartite graph of visible servers and invisible servers based on the determined network traffic redirection information. First, based on the results of the server visibility check, the malicious infrastructure detection component classifies all the identified servers within the network as either a visible server or an invisible server. Then, the malicious infrastructure detection component determines the server vertices and edges within the bipartite graph that are involved in network traffic redirection chains from visible servers to invisible servers. For each edge in the bipartite graph involved in a network traffic redirection chain, the malicious infrastructure detection component extracts graph-based features, such as, for example, out-degree of each invisible server, in-degree of each invisible server, and the ratio between out-degree and in-degree for each invisible server involved in a network traffic redirection chain. An out-degree is a number of directed edges going out of a particular server vertex. An in-degree is a number of directed edges coming into a particular server vertex.

In addition, for each edge in the bipartite graph involved in a network traffic redirection chain, the malicious infrastructure detection component also extracts distance-based features, such as, for example, a distance between IP address numbers of each of the invisible servers, a difference in domain name registration information between each of the invisible servers, and a distance in physical location between each of the invisible servers. Afterward, the malicious infrastructure detection component inputs the extracted graph-based features and extracted distance-based features into a machine learning classifier, such as, for example, a J48 decision tree algorithm, which is trained on known malicious Web infrastructures, to detect malicious edges between visible server vertices and invisible server vertices. The malicious infrastructure detection component uses the detected malicious edges between visible server vertices and invisible server vertices to identify malicious servers within a malicious Web infrastructure.

The malicious infrastructure server propagation chain detection component builds a network traffic propagation chain graph and then propagates malicious scores of servers onto the graph to identify additional malicious servers based on their correlations with identified malicious servers, which were identified as malicious servers by the malicious infrastructure detection component. First, the malicious infrastructure server propagation chain detection component builds the network traffic propagation chain graph for the invisible servers that are accessed through redirection based on redirection relationships, such as, for example, HTTP redirection, Javascript redirection, and Iframe redirection. For invisible servers that are accessed through direct client device visit, the malicious infrastructure server propagation chain detection component runs a clustering program to group invisible servers that share certain features, such as, for example, common or similar IP addresses, common or similar Whois information, or common or similar accessing client IP addresses. Whois is a query and response protocol that is used for querying databases storing information corresponding to registered users or assignees of Internet resources, such as, for example, domain names, IP address blocks, and other similar resources. Then, the malicious infrastructure server propagation chain detection component generates relationships between those invisible servers within a same cluster and augments the network traffic propagation chain graph by adding new edges representing the new relationships. For example, if two invisible servers share similar IP addresses, Whois information, or accessing client IP addresses, the malicious infrastructure server propagation chain detection component will add an edge between those two invisible servers.

After building the network traffic propagation chain graph, the malicious infrastructure server propagation chain detection component assigns a malicious score ($S_{mal}$) and generates a visibility score ($S_{vis}$) for each server in the network traffic propagation chain graph. For each server that was detected by the malicious infrastructure detection component as being a malicious server, the malicious infrastructure server propagation chain detection component assigns a malicious score of one ($S_{mal}=1$). For all other servers, the malicious infrastructure server propagation chain detection component assigns a malicious score of zero ($S_{mal}=0$). The malicious infrastructure server propagation chain detection component generates the visibility score as the number of connected visible servers over the number of connected invisible servers using the following equation:

$$S_{Vis} = \min\left(1, \frac{Num_{vis}}{Num_{invis} + 1}\right).$$

Then, the malicious infrastructure server propagation chain detection component annotates both the assigned malicious scores and generated visibility scores onto the corresponding server vertices of the network traffic propagation chain graph. Afterward, the malicious infrastructure server propagation chain detection component iteratively propagates malicious scores and visibility scores of server vertices to neighboring server vertices and recalculates the malicious scores and visibility scores of the neighboring server vertices. After several iterations of score propagation to neighboring server vertices, the graph will achieve a stable state with new malicious and visibility scores of server vertices changing very little or not at all. For those invisible servers whose new malicious score is greater than a predefined malicious score threshold value ($\alpha$) and whose new visibility score is less than a predefined visibility score threshold value ($\beta$), the malicious infrastructure server propagation chain detection component identifies those invisible servers as malicious servers. For those visible servers whose new malicious score is greater than the predefined malicious score threshold value ($\alpha$) and whose new visibility score is less than the predefined visibility score threshold value ($\beta$), the malicious infrastructure server propagation chain detection component identifies those visible servers as compromised servers.

Figure 3:
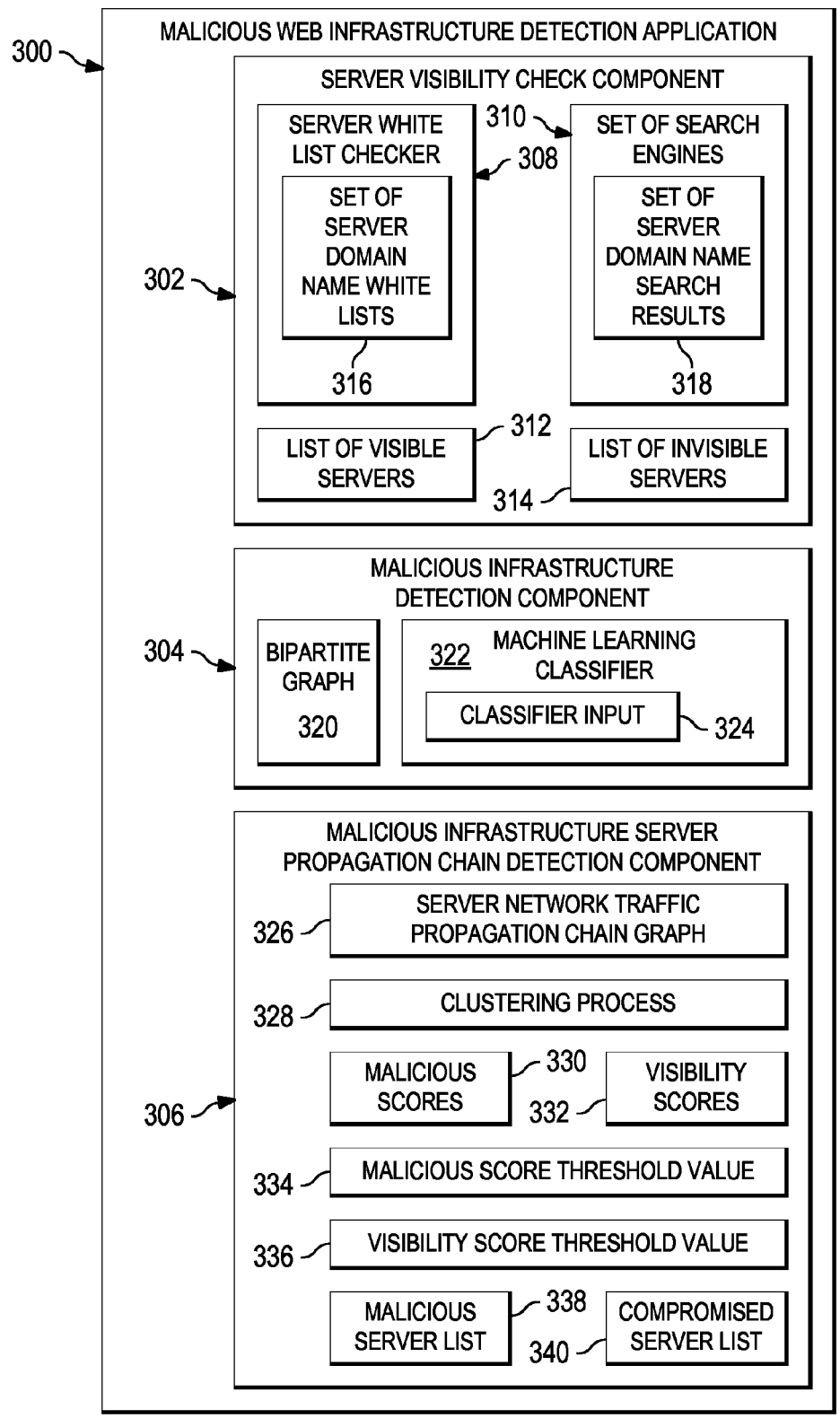
FIG. 3 is a diagram of an example of components of a malicious Web infrastructure detection application in accordance with an illustrative embodiment.

With reference now to FIG. 3, a diagram of an example of components of a malicious Web infrastructure detection application is depicted in accordance with an illustrative embodiment. Malicious Web infrastructure detection application 300 may be, for example, malicious Web infrastructure detection application 218 in FIG. 2. In this example, malicious Web infrastructure detection application 300 includes server visibility check component 302, malicious infrastructure detection component 304, and malicious infrastructure server propagation chain detection component 306. However, it should be noted that malicious Web infrastructure detection application 300 may include more or fewer components than shown. For example, one or more components may be combined into one component. Also, one or more components of malicious Web infrastructure detection application 300 may be implemented in one or more computers or data processing systems.

Server visibility check component 302 automatically determines whether each identified server within a network is either a visible server or an invisible server. A visible server is a network server that is directly accessed by a client device and is visible to the accessing client device. An invisible server is a network server that is typically indirectly accessed by a client device via a visible server and is not visible to the accessing client device. However, sometimes a client device may access an invisible server directly.

In this example, server visibility check component 302 includes server white list checker 308, set of search engines 310, list of visible servers 312, and list of invisible servers 314. First, server visibility check component 302 utilizes server white list checker 308 to determine whether a server is listed on set of server domain name white lists 316. Set of server domain name white lists 316 may be stored in server visibility check component 302 or may be stored on one or more remote server devices. Set of server domain name white lists 316 is a set of one or more white lists that contain listings of domain names for servers that are determined to be benign or safe (i.e., not malicious). If server visibility check component 302 locates a server within set of server domain name white lists 316, then server visibility check component 302 identifies that server as a visible server and places that server within list of visible servers 312.

If server visibility check component 302 does not locate a particular server within set of server domain name white lists 316, then server visibility check component 302 utilizes set of search engines 310 to conduct a Web search for domain names of servers. Set of search engines 310 is a set of one or more Web search engines that generate set of server domain name search results 318. Set of server domain name search results 318 is a set of one or more Web search results containing domain names of servers that are determined to be benign or safe.

If server visibility check component 302 does not locate a particular server within set of server domain name white lists 316, but does locate that particular server within set of server domain name search results 318, then server visibility check component 302 identifies that particular server as a visible server and places that particular server within list of visible servers 312. If server visibility check component 302 does not locate a particular server within set of server domain name white lists 316 and does not locate that particular server within set of server domain name search results 318, then server visibility check component 302 identifies that particular server as an invisible server and places that particular server within list of invisible servers 314.

Figures 4, 5:
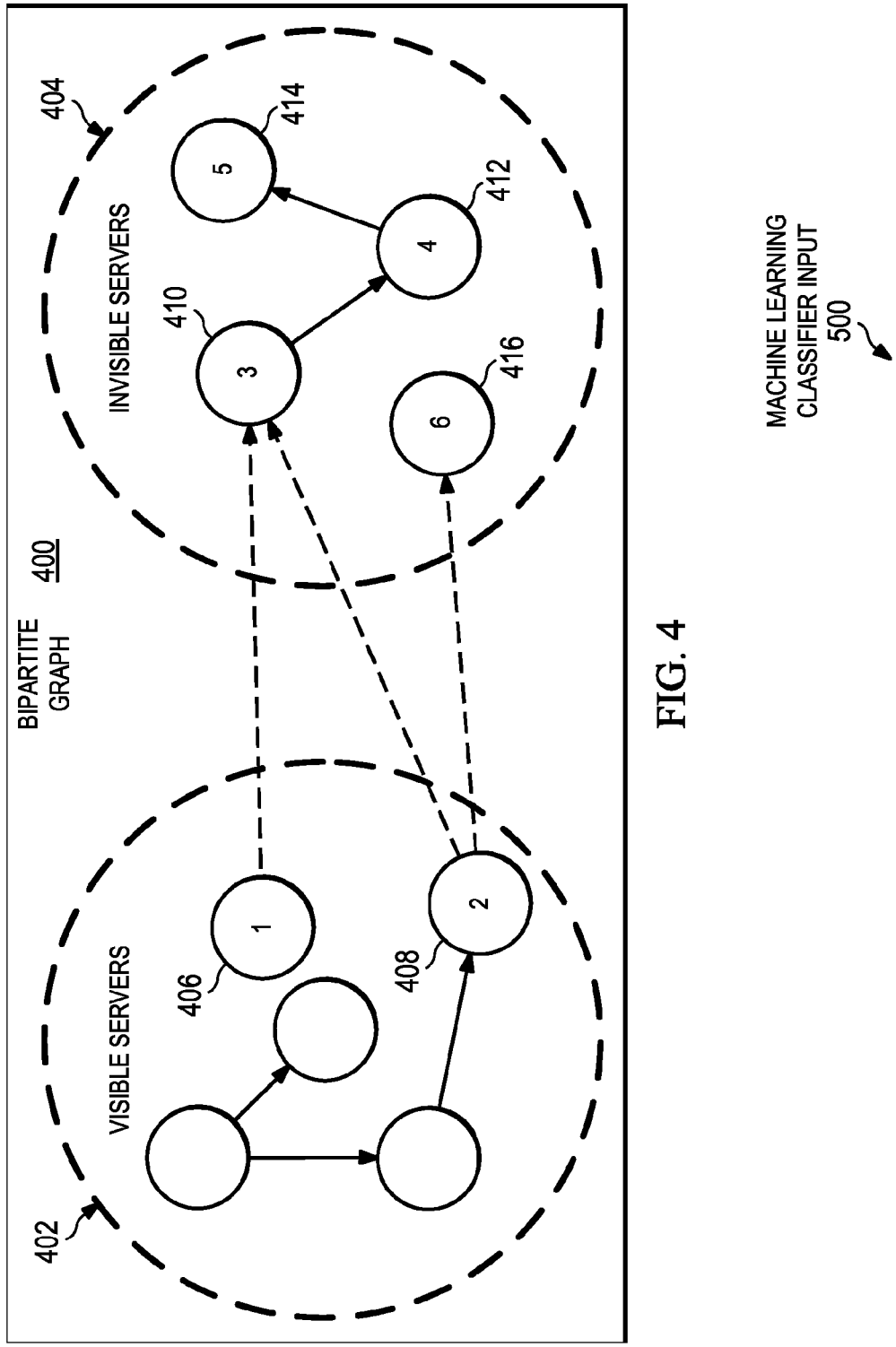
FIG. 4 is a diagram of an example of a bipartite graph in accordance with an illustrative embodiment.
FIG. 5 is a specific example of machine learning classifier input in accordance with an illustrative embodiment.

Malicious infrastructure detection component 304 identifies malicious servers within one or more malicious Web infrastructures in a network. In this example, malicious infrastructure detection component 304 includes bipartite graph 320 and machine learning classifier 322. Malicious infrastructure detection component 304 generates bipartite graph 320 utilizing list of visible servers 312 and list of invisible servers 314 generated by server visibility check component 302. A bipartite graph is a graph whose vertices can be divided into two disjoint sets (i.e., a set of visible servers and a set of invisible servers). An example of a bipartite graph is illustrated in FIG. 4.

After generating bipartite graph 320 of visible server vertices and invisible server vertices, malicious infrastructure detection component 304 determines directed edges from visible servers to invisible servers involved in network traffic redirection chains within bipartite graph 320. For each edge involved in a network traffic redirection chain, malicious infrastructure detection component 304 extracts graph-based features, such as, for example, out-degree, in-degree, and ratio between out-degree and in-degree for each invisible server involved in a network traffic redirection chain. In addition, for each edge involved in a network traffic redirection chain, malicious infrastructure detection component 304 also extracts distance-based features, such as, for example, distance between IP address numbers, difference in domain name registration information, and distance in physical location for each invisible server involved in a network traffic redirection chain.

After extracting the graph-based and distance-based features of the invisible servers involved in a network traffic redirection chain, malicious infrastructure detection component 304 inputs the extracted graph-based and distance-based features (i.e., classifier input 324) into machine learning classifier 322. Machine learning classifier 322 may be, for example, a decision tree algorithm trained on known malicious Web infrastructures. Machine learning classifier 322 detects malicious edges between visible server vertices and invisible server vertices involved in a network traffic redirection chain based on classifier input 324. Utilizing the detected malicious edges between visible server vertices and invisible server vertices involved in a network traffic redirection chain, malicious infrastructure detection component 304 is able to identify malicious servers.

Malicious infrastructure server propagation chain detection component 306 identifies additional malicious servers based on their correlations to servers previously identified as malicious by malicious infrastructure detection component 304. First, malicious infrastructure server propagation chain detection component 306 generates server network traffic propagation chain graph 326 using relationships of invisible servers accessed through redirection. For invisible servers that are accessed through direct client device visit, malicious infrastructure server propagation chain detection component 306 runs clustering process 328 to group invisible servers that share common or similar features, such as, for example, IP addresses, Whois information, or client IP addresses.

After running clustering process 328, malicious infrastructure server propagation chain detection component 306 generates relationships between those invisible servers within a same cluster and augments server network traffic propagation chain graph 326 by adding new edges representing the new relationships.

Further, malicious infrastructure server propagation chain detection component 306 assigns a malicious score and generates a visibility score for each server involved in a network traffic redirection chain. For each server that was previously identified by malicious infrastructure detection component 304 as being malicious, malicious infrastructure server propagation chain detection component 306 assigns a malicious score of one. For all other servers not previously identified as malicious, malicious infrastructure server propagation chain detection component 306 assigns a malicious score of zero. The malicious score of each server may be stored in malicious scores 330. Malicious infrastructure server propagation chain detection component 306 generates the visibility score as the number of connected visible servers over the number of connected invisible servers for each server involved in a network traffic redirection chain. The visibility score of each server maybe stored in visibility scores 332.

Afterward, malicious infrastructure server propagation chain detection component 306 adds the assigned malicious score and generated visibility score to each corresponding server vertex in server network traffic propagation chain graph 326. Then, malicious infrastructure server propagation chain detection component 306 propagates malicious scores and visibility scores of server vertices to neighboring server vertices and then recalculates the corresponding malicious and visibility scores of the neighboring server vertices. Subsequent to iteratively propagating malicious and visibility scores to neighboring server vertices, malicious infrastructure server propagation chain detection component 306 identifies invisible servers having a new malicious score greater than malicious score threshold value 334 and having a new visibility score less than visibility score threshold value 336 as malicious and adds those invisible servers to malicious server list 338. Malicious infrastructure server propagation chain detection component 306 identifies visible servers having a new malicious score greater than malicious score threshold value 334 and having a new visibility score less than visibility score threshold value 336 as compromised and adds those visible servers to compromised server list 340.

With reference now to FIG. 4, a diagram of an example of a bipartite graph is depicted in accordance with an illustrative embodiment. Bipartite graph 400 may be, for example, bipartite graph 316 in FIG. 3. Bipartite graph 400 places each server of a plurality of servers within a network in one of two different sets of servers. One set of servers is visible servers 402 and the other set of servers is invisible servers 404.

In this example, visible server 1 406 and visible server 2 408 are involved in server network traffic redirection chains. For example, visible server 1 406 redirects network traffic to invisible server 3 410, which redirects the network traffic to invisible server 4 412, which in turn redirects the network traffic to invisible server 5 414. Similarly, visible server 2 408 redirects network traffic to invisible server 3 410, which redirects the network traffic to invisible server 4 412, which in turn redirects the network traffic to invisible server 5 414. In addition, visible server 2 408 redirects other network traffic to invisible server 6 416. A malicious infrastructure detection component, such as malicious infrastructure detection component 304 in FIG. 3, analyzes the relationships between visible servers and the invisible servers involved in the network traffic redirection chains by extracting graph-based features and distance-based features for each invisible server involved in a particular network traffic redirection chain. In this example, graph-based features for invisible server 3 410 are out-degree of 1, in-degree of 2, and a ratio between out-degree and in-degree of 0.5

With reference now to FIG. 5, a specific example of machine learning classifier input is depicted in accordance with an illustrative embodiment. Machine learning classifier input 500 may be, for example, classifier input 320 in FIG. 3. Machine learning classifier input 500 is input into a machine learning classifier, such as, for example, machine learning classifier 322 in FIG. 3. In this example, machine learning classifier input 500 includes format 502 and example 504.

Format 502 represents an example format for machine learning classifier input 500. In this example, the format is relation, out-degree, in-degree, ratio between out-degree and in-degree, IP distance, registration information distance, and physical location distance. However, it should be noted that illustrative embodiments may utilize other formats as well.

Using format 502 and an example from FIG. 4, example 504 includes a relation of "visible_server_1→invisible_server_3", an out-degree of "1", an in-degree of "2", a ratio between out-degree and in-degree of "0.5", an IP distance of "false", a registration information distance of "false", and a physical location distance of "false". In this example, false means not related and true means related. For example, the IP address distance between visible server 1 and invisible server 3 is too far apart to be considered related.

Figure 6:
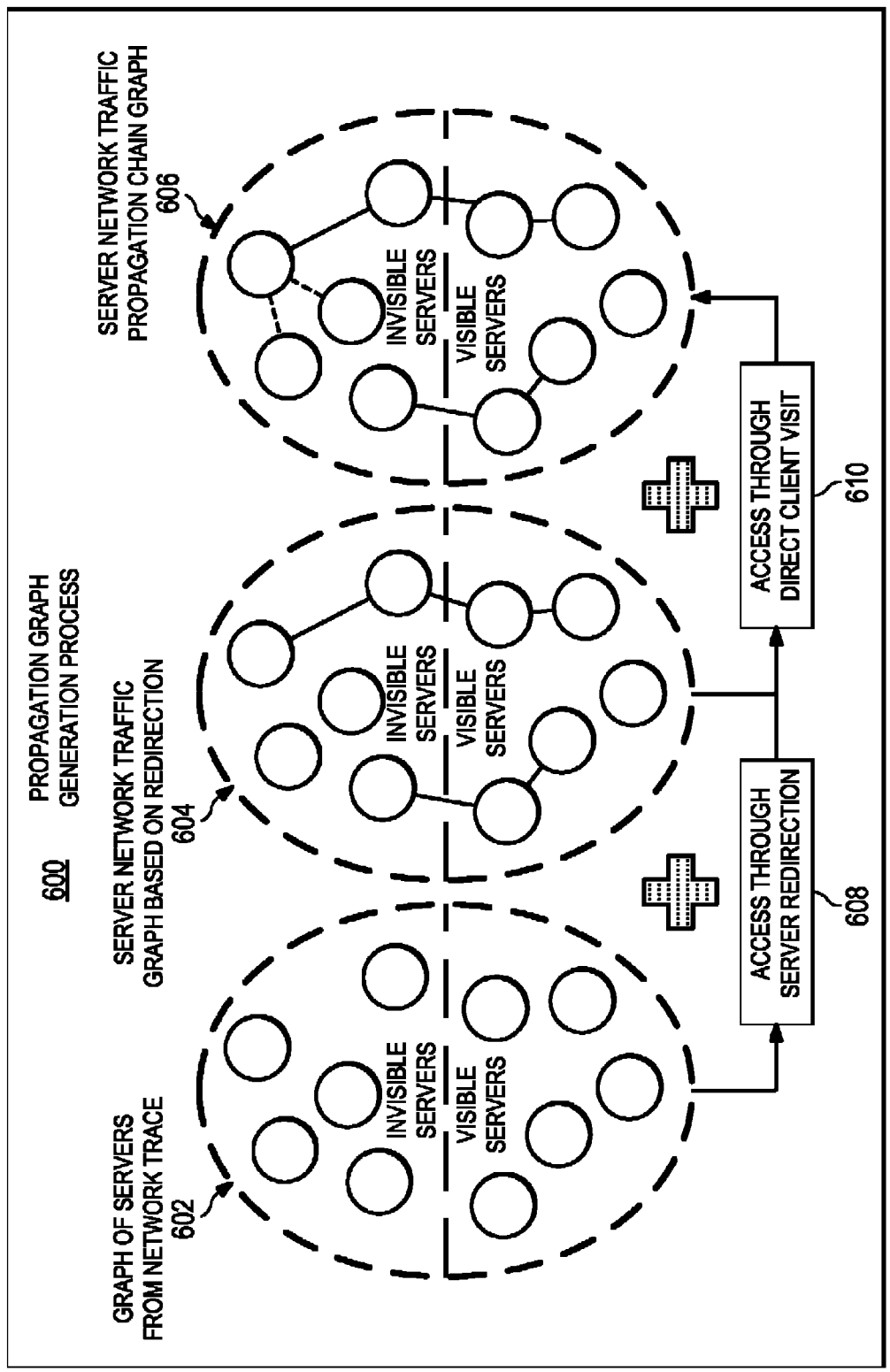
FIG. 6 is a diagram of an example of a propagation graph generation process in accordance with an illustrative embodiment.

With reference now to FIG. 6, a diagram of an example of a propagation graph generation process is depicted in accordance with an illustrative embodiment. Propagation graph generation process 600 is a process for generating a server network traffic propagation chain graph, such as, for example, server network traffic propagation chain graph 322 in FIG. 3. In this example, propagation graph generation process 600 includes generating graph of servers from network trace 602, generating server network traffic graph based on redirection 604, and finally generating server network traffic propagation chain graph 606.

Graph of servers from network trace 602 is a bipartite graph of visible servers and invisible servers, such as bipartite graph 400 in FIG. 4, generated by a server visibility check component, such as server visibility check component 302 in FIG. 3. Server network traffic graph based on redirection 604 is a graph showing edges between servers based on access through server redirection 608. Server network traffic propagation chain graph 606 is a graph showing edges based on access through direct client visit 610.

Figure 7:
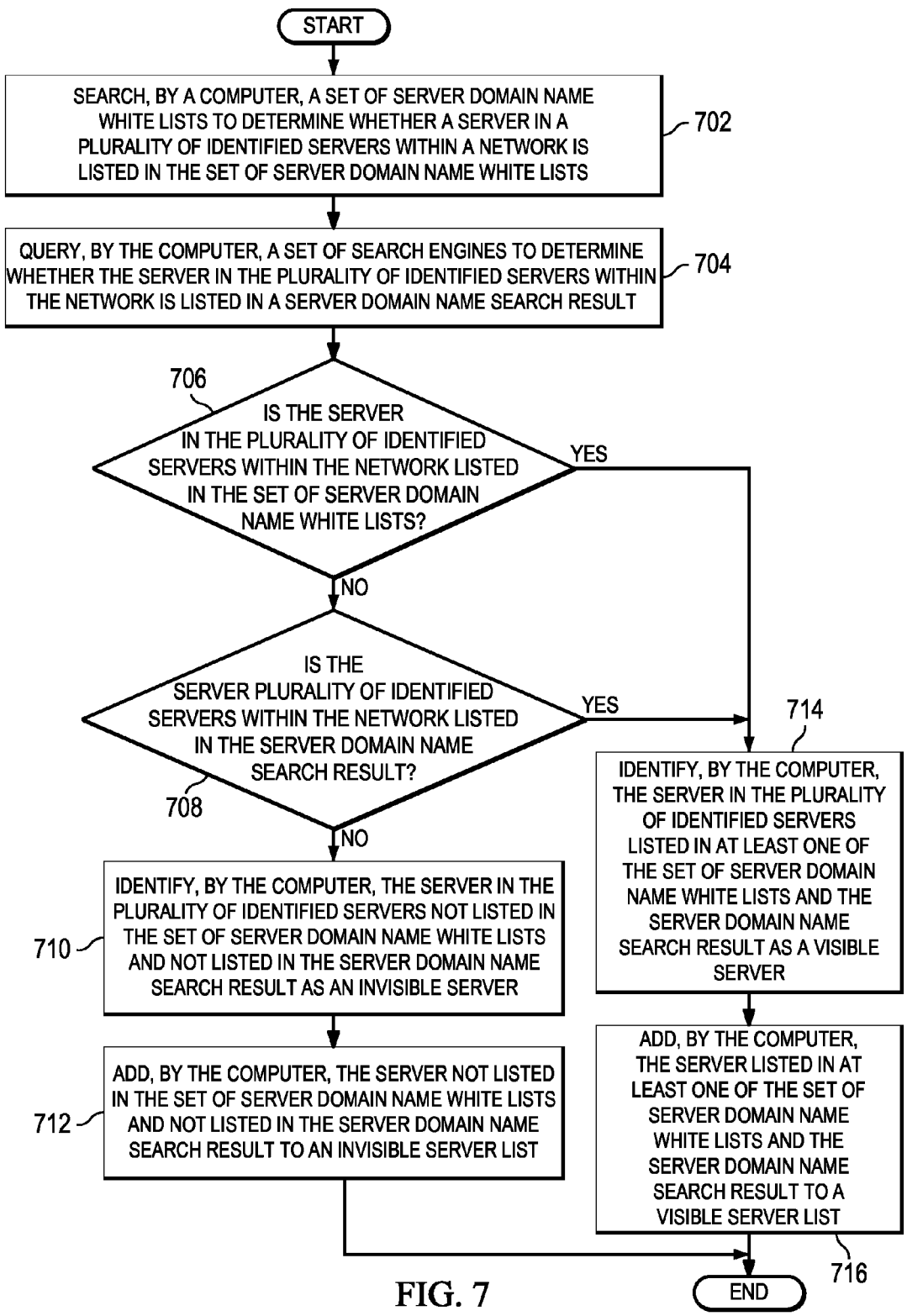
FIG. 7 is a flowchart illustrating a process for identifying servers within a network as either a visible server or an invisible server in accordance with an illustrative embodiment.

With reference now to FIG. 7, a flowchart illustrating a process for identifying servers within a network as either a visible server or an invisible server is shown in accordance with an illustrative embodiment. The process shown in FIG. 7 may be implemented in a computer, such as data processing system 200 in FIG. 2.

The process begins when the computer automatically searches a set of server domain name white lists to determine whether a server in a plurality of identified servers within a network is listed in the set of server domain name white lists (step 702). The computer may use a server white list checker component, such as server white list checker 308 in FIG. 3, to search the set of server domain name white lists, such as set of server domain name white lists 318 in FIG. 3. In addition, the computer queries a set of search engines to determine whether the server in the plurality of identified servers within the network is listed in a server domain name search result (step 704). The set of search engines may be, for example, set of search engines 310 in FIG. 3. The server domain name search result may be, for example, set of server domain name search results 318 in FIG. 3.

Afterward, the computer makes a determination as to whether the server in the plurality of identified servers within the network is listed in the set of server domain name white lists (step 706). If the computer determines that the server in the plurality of identified servers within the network is not listed in the set of server domain name white lists, no output of step 706, then the computer makes a determination as to whether the server in the plurality of identified servers within the network is listed in the server domain name search result (step 708). If the computer determines that the server in the plurality of identified servers within the network is not listed in the server domain name search result, no output of step 708, then the computer identifies the server in the plurality of identified servers not listed in the set of server domain name white lists and not listed in the server domain name search result as an invisible server (step 710). The computer adds the server not listed in the set of server domain name white lists and not listed in the server domain name search result to an invisible server list, such as list of invisible servers 314 in FIG. 3 (step 712). Thereafter, the process terminates.

Returning again to step 706, if the computer determines that the server in the plurality of identified servers within the network is listed in the set of server domain name white lists, yes output of step 706, then the computer identifies the server in the plurality of identified servers listed in at least one of the set of server domain name white lists and the server domain name search result as a visible server (step 714). The computer then adds the server listed in at least one of the set of server domain name white lists and the server domain name search result to a visible server list, such as list of visible servers 312 in FIG. 3 (step 716). Thereafter, the process terminates.

Returning again to step 708, if the computer determines that the server in the plurality of identified servers within the network is listed in the server domain name search result, yes output of step 708, then the process proceeds to step 714 where the computer identifies the server as a visible server and adds the server to the visible server list at step 716 with the process terminating thereafter.

Figure 8B:
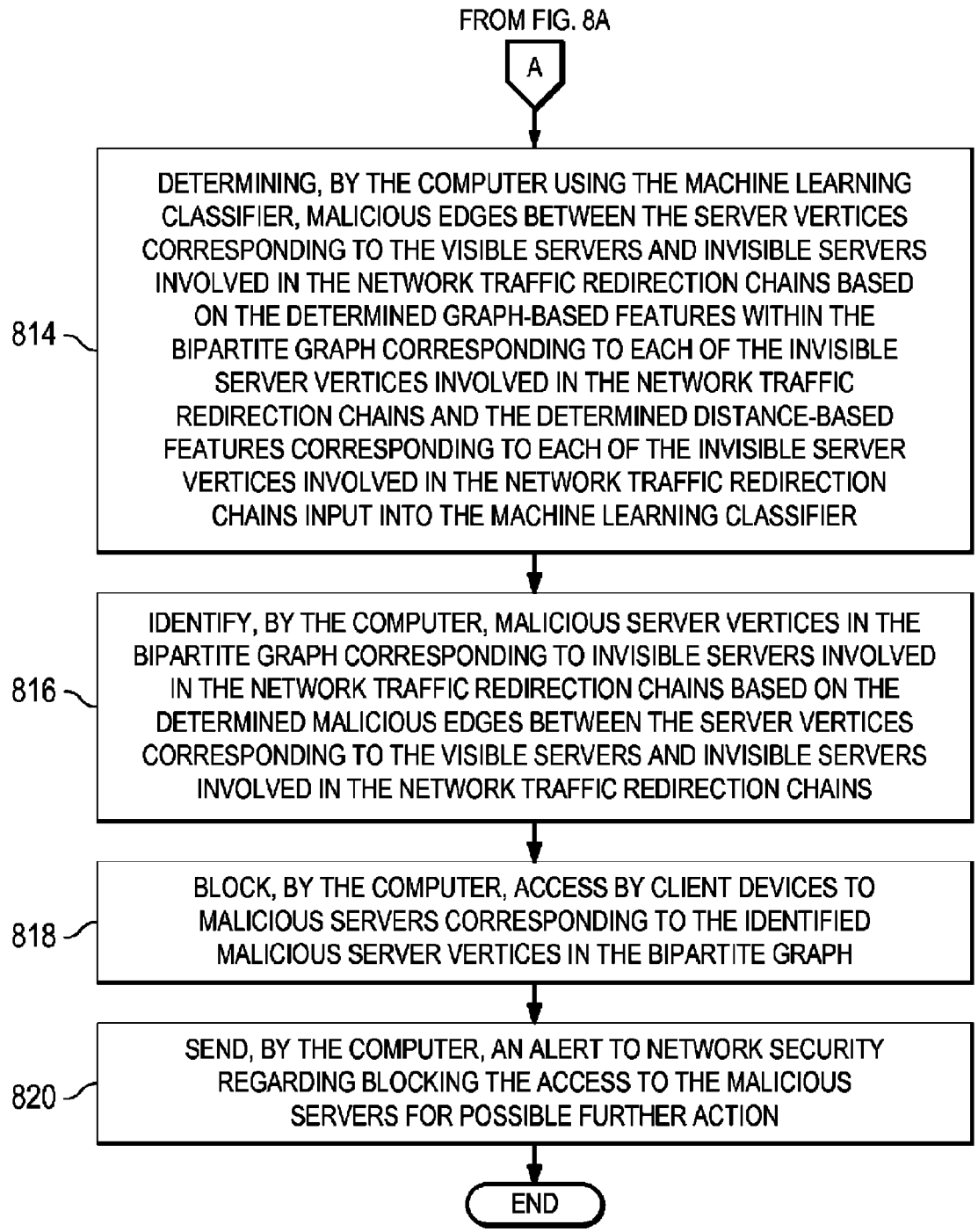

With reference now to FIGS. 8A and 8B, a flowchart illustrating a process for identifying malicious servers within a network is shown in accordance with an illustrative embodiment. The process shown in FIGS. 8A and 8B may be implemented in a computer, such as data processing system 200 in FIG. 2.

The process begins when the computer generates a bipartite graph of visible servers and invisible servers in a plurality of identified servers within a network (step 802). The bipartite graph may be, for example, bipartite graph 400 in FIG. 4. The computer places each server in the plurality of identified servers within the network in the bipartite graph of visible servers and invisible servers based on locating each server in one of a visible server list or an invisible server list (step 804). The computer also analyzes network traffic redirection chains from visible servers to invisible servers within the network in the bipartite graph (step 806).

Afterward, by the computer identifies a set of server vertices corresponding to the visible servers and invisible servers in the bipartite graph involved in the network traffic redirection chains from the visible servers to the invisible servers based on the analysis (step 808). Then, for each edge between the server vertices corresponding to the visible servers and invisible servers in the bipartite graph involved in the network traffic redirection chains, the computer determines graph-based features within the bipartite graph corresponding to each of the invisible server vertices involved in the network traffic redirection chains and distance-based features corresponding to each of the invisible server vertices involved in the network traffic redirection chains (step 810).

Subsequently, the computer inputs the determined graph-based features within the bipartite graph corresponding to each of the invisible server vertices involved in the network traffic redirection chains and the determined distance-based features corresponding to each of the invisible server vertices involved in the network traffic redirection chains into a machine learning classifier (step 812). The machine learning classifier may be, for example, machine learning classifier 322 in FIG. 3. The computer, using the machine learning classifier, determines malicious edges between the server vertices corresponding to the visible servers and invisible servers involved in the network traffic redirection chains based on the determined graph-based features within the bipartite graph corresponding to each of the invisible server vertices involved in the network traffic redirection chains and the determined distance-based features corresponding to each of the invisible server vertices involved in the network traffic redirection chains input into the machine learning classifier (step 814).

The computer then identifies malicious server vertices in the bipartite graph corresponding to invisible servers involved in the network traffic redirection chains based on the determined malicious edges between the server vertices corresponding to the visible servers and invisible servers involved in the network traffic redirection chains (step 816). Further, the computer blocks access to malicious servers corresponding to the identified malicious server vertices in the bipartite graph (step 818). The computer also sends an alert to network security regarding blocking the access to the malicious servers for possible further action (step 820). Thereafter, the process terminates.

With reference now to FIG. 9, a flowchart illustrating a process for propagating malicious and visibility scores of identified malicious servers to neighboring invisible servers to identify additional malicious servers based on their correlation to the identified malicious servers is shown in accordance with an illustrative embodiment. The process shown in FIG. 9 may be implemented in a computer, such as data processing system 200 in FIG. 2.

The process begins when the computer generates a propagation graph that includes each invisible server accessed via network traffic redirection based on all network traffic redirection relationships between invisible servers (step 902). In addition, the computer clusters those invisible servers accessed via direct client visit into different groups based on shared common features between those invisible servers accessed via direct client visit (step 904). Further, the computer generates a relationship between those invisible servers accessed via direct client visit within a same group (step 906).

Afterward, the computer adds an edge between those invisible servers with the generated relationship within the same group (step 908). The computer also assigns a malicious score to those invisible servers that have been previously identified as a malicious server by a machine learning classifier, such as machine learning classifier 322 in FIG. 3 (step 910). Further, the computer generates a visibility score for those invisible servers that have been previously identified as a malicious server by the machine learning classifier (step 912).

Subsequently, the computer adds the assigned malicious score and the generated visibility score to corresponding server vertices within the propagation graph (step 914). In addition, the computer propagates the assigned malicious score and the generated visibility score of a corresponding server vertex to neighboring server vertices within the propagation graph (step 916). Then, the computer generates a new malicious score and a new visibility score for each of the neighboring server vertices within the propagation graph based on propagating malicious and visibility scores (step 918). Afterward, the computer identifies each server corresponding to a server vertex within the propagation graph having the generated new malicious score greater than a predefined malicious score threshold value and having the generated new visibility score less than a predefined visibility score threshold value as a malicious server (step 920). Thereafter, the process terminates.

Thus, illustrative embodiments provide a computer-implemented method, computer system, and computer program product for identifying malicious servers within malicious Web infrastructures based on visibility of network servers and topology of network traffic redirection chains of the network servers. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for identifying malicious servers, the computer-implemented method comprising:

searching, by a computer, a set of server domain name white lists to determine whether a server in a plurality of identified servers within a network is listed in the set of server domain name white lists;

querying, by the computer, a set of search engines to determine whether the server in the plurality of identified servers within the network is listed in a server domain name search result;

responsive to the computer determining that the server in the plurality of identified servers within the network is not listed in the set of server domain name white lists and not listed in the server domain name search result, identifying, by the computer, the server as an invisible server and adding, by the computer, the server to an invisible server list;

responsive to the computer determining that the server in the plurality of identified servers within the network is listed in at least one of the set of server domain name white lists and the server domain name search result, identifying, by the computer, the server in the plurality of identified servers as a visible server and adding, by the computer, the server to a visible server list;

placing, by the computer, each server in the plurality of identified servers within the network in a bipartite graph based on locating each server in one of the visible server list or the invisible server list;

determining, by the computer, malicious edges between server vertices corresponding to visible servers and invisible servers involved in network traffic redirection chains based on determined graph-based features within the bipartite graph corresponding to visible and invisible server vertices involved in the network traffic redirection chains and determined distance-based features corresponding to the invisible server vertices involved in the network traffic redirection chains;

identifying, by the computer, malicious server vertices in the bipartite graph based on the determined malicious edges between the server vertices corresponding to the visible servers and invisible servers involved in the network traffic redirection chains; and blocking, by the computer, access by client devices to malicious servers corresponding to the identified malicious server vertices in the bipartite graph.

2. The computer-implemented method of claim 1 further comprising:

inputting, by the computer, the determined graph-based features within the bipartite graph corresponding to the invisible server vertices involved in the network traffic redirection chains and the determined distance-based features corresponding to the invisible server vertices involved in the network traffic redirection chains into a machine learning classifier.

3. The computer-implemented method of claim 2, wherein the determined graph-based features are out-degree, in-degree, and a ratio between out-degree and in-degree for each invisible server involved in a network traffic redirection chain.

4. The computer-implemented method of claim 2, wherein the determined distance-based features are distance between IP address numbers of each of the invisible servers, difference in domain name registration information between each of the invisible servers, and distance in physical location between each of the invisible servers.

5. The computer-implemented method of claim 1 further comprising:

assigning, by the computer, a malicious score to those invisible servers identified as malicious.

6. The computer-implemented method of claim 5 further comprising:

generating, by the computer, a visibility score for those invisible servers identified as malicious.

7. The computer-implemented method of claim 6 further comprising:

adding, by the computer, the assigned malicious score and the generated visibility score to corresponding server vertices within a server network traffic propagation chain graph; and propagating, by the computer, the assigned malicious score and the generated visibility score of a corresponding server vertex to neighboring invisible server vertices within the server network traffic propagation chain graph.

8. The computer-implemented method of claim 7 further comprising:

recalculating, by the computer, the malicious score and the visibility score for each of the neighboring server vertices within the server network traffic propagation chain graph based on the propagating of malicious and visibility scores; and identifying, by the computer, each server corresponding to a server vertex within the propagation graph having the recalculated malicious score greater than a predefined malicious score threshold value and having the generated new recalculated visibility score less than a predefined visibility score threshold value as a malicious server.

\* \* \* \* \*